United States Patent
Onodera et al.

(12) 
(10) Patent No.: US 6,671,288 B1
(45) Date of Patent: *Dec. 30, 2003

(54) CONTROL APPARATUS HAVING WINDOW CONTROL FUNCTION

(75) Inventors: Yasuko Onodera, Kawasaki (JP); Kenichiro Sakai, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,517

(22) Filed: Mar. 27, 2000

(30) Foreign Application Priority Data

Jul. 8, 1999 (JP) .......................... 11-194633

(51) Int. Cl.$^7$ .................................. H04J 3/16
(52) U.S. Cl. ................... 370/469; 379/413.02; 709/236
(58) Field of Search .................. 370/464, 465, 370/469, 474; 379/413.02; 455/15, 16; 709/232, 236, 253

(56) References Cited

U.S. PATENT DOCUMENTS

| | | | | |
|---|---|---|---|---|
| 4,653,048 A | * | 3/1987 | Anderson et al. | 714/49 |
| 4,831,512 A | * | 5/1989 | Nakai et al. | 709/231 |
| 5,970,067 A | * | 10/1999 | Sathe et al. | 370/394 |
| 5,987,030 A | * | 11/1999 | Brockhage et al. | 370/394 |
| 6,052,385 A | * | 4/2000 | Kanerva et al. | 370/468 |
| 6,405,251 B1 | * | 6/2002 | Bullard et al. | 709/224 |

FOREIGN PATENT DOCUMENTS

| | | |
|---|---|---|
| JP | 3-195147 | 8/1991 |
| JP | 4-150240 | 5/1992 |
| JP | 4-192742 | 7/1992 |
| JP | 8-79304 | 3/1996 |
| JP | 9-326843 | 12/1997 |
| JP | 10-229238 | 8/1998 |

OTHER PUBLICATIONS

Akaike Distributed multilink system for very–high speed data link control Selected Areas in Communications, IEEE Journal on, vol.: 11 Issue: 4, May 1993 Page(s): 540–549.*

* cited by examiner

Primary Examiner—Hassan Kizou
Assistant Examiner—Dmitry Levitan
(74) Attorney, Agent, or Firm—Katten Munchin Zavis Rosenman

(57) ABSTRACT

A control apparatus with a window control function including a distance computation unit for computing a signed n-bit distance as a result of subtraction of a second sequence number cyclically updated to vary like a modulo-N number from a first sequence number also cyclically updated to vary like a modulo-N number where N is a positive integer greater than 1 and the nth power of 2 is greater than N($2^n > N$), and a lowest-order-bit extraction unit for extracting m lowest-order bits of the distance where the mth power of 2 is equal to N($2^m = N$). The control apparatus further includes a distance judgment unit for forming a judgment as to whether or not the first sequence number is within a window set with the second sequence number used as a reference by comparison of the m lowest-order bits of the distance extracted by the lowest-order-bit extraction means with a size of the window.

7 Claims, 11 Drawing Sheets

——4093→ : Transmitted frame with a sequence number of 4,093

←--4093-- : Delivery confirmation of a sequence number of 4,093

Transmission side(6)

Transmission side(7)

Transmission side(8)

Transmission side(9)

Transmission side(10)

Reception side(11)

Reception side(12)

Reception side(13)

Reception side(14)

Reception side(15)

CONTROL APPARATUS HAVING WINDOW CONTROL FUNCTION

BACKGROUND OF THE INVENTION

1. Field of the Invention

The present invention relates to a control apparatus having a window control function, a communication control apparatus having a window control function and a storage medium for storing a window control program.

2. Description of the Related Art

A large amount of data is transmitted from a telephone exchange to a terminal such as an accounting transaction center connected to the telephone exchange by splitting the data into typically packets. The terminal on the reception side receives the data which is then subjected to next processing. In this case, the transmitter may be connected to the receiver by one transmission line. In such a system, the order of receiving the data is always the same as the order in which the data is transmitted. Thus, the receiver may just supply the received data to the next processing in the same order as the order of receiving the data. By using only one transmission line, however, the amount of data transmitted in a unit time is limited. In order to transmit a large amount of data, it is thus necessary to connect the transmitter to the receiver by using a plurality of transmission lines as is the case with a representative MLP (Multilink Procedure) of the ITU-recommended X25 interface. In this case, a sequence number is assigned to each piece of distributed data, and the pieces of data are transmitted through the transmission lines by distributing the pieces of data among the lines. However, it is quite within the bounds of possibility that the order of data reception at reception time does not match the sequence numbers assigned to the pieces of data due to differences in length between the pieces of data and differences in transmission speed between the transmission lines. In order to solve this problem, in the MLP, the order is controlled by carrying out the following processing.

The transmitter adopts a technique of assigning sequence numbers pertaining to a series having a modulo value. For example, sequence numbers with a modulo value of 4,096 are assigned to pieces of transmitted data. The receiver supplies the received pieces of data sequentially to the next processing in accordance with the sequence numbers assigned to the pieces of data. If the sequence number assigned to a received specific piece of data is not the expected number, the particular piece of data is put in a state waiting for a piece of data with the expected sequence number to arrive. As the piece of data with the expected sequence number is received, this piece of data is supplied to the next processing along with the particular piece of data put in a wait state. If the sequence number assigned to a received specific piece of data is much different from the expected sequence number, however, a problem of destruction arises. To be more specific, the receiver is put in a dilemma as to whether to let a received piece of data enter a wait state or to let the data be discarded in accordance with the value of the expected sequence number. It is necessary to set a tolerance for choosing one of the 2 dilemma alternatives. Such a tolerance is referred to as a window. To put it in detail, if the sequence number of a received piece of data is the expected sequence number, the piece of data is supplied to the next processing. If the sequence number of a received piece of data is within a window, the piece of data is put in a wait state. If the sequence number of a received piece of data is outside the window, on the other hand, the piece of data is discarded.

However, processing to form a judgment as to whether or not the sequence number of a received piece of data is within a window can not be carried out by simple comparison of the magnitudes of numbers if sequence numbers assigned to transmitted pieces of data are a series of numbers changing as a modulo-value number. This is because, in the case of a modulo value of 4,096, for example, the number following 4,095 is 0. Thus, the formation of such a judgment must be based on a complex algorithm which lengthens the time it takes to justify either the wait state of data or the destruction of the data. For example, assume that the sequence number of a received piece of data is MN (S)=0, the expected sequence number of a piece of data to be received next is MV (R)=4,090, the window size MW=8 and the modulo value is 4,096. In this case, the following complex processing is carried out.

(1) The window boundary value is of 4,098 (=MV (R)+MW).

(2) Since the upper boundary value 4,098 is greater than the modulo value 4,096 (4,098>4,096), the window is a pattern including 0.

(3) The window thus covers the range the range 0 to 2, where the number 2 is modulo 4,096 of 4,098, that is, 2=4,098−4,096. That is to say, it is obvious that an MN (S) in the range 0 to 2 is also within the window.

(4) The value of 2 is found by extracting the 12 lowest-order bits from the boundary value of 4,098. The 12 bits of the upper boundary value of 4,098 is B'1000000000010'.

The 12 lowest-order bits of the boundary value of 4,098 is B'000000000010' or D'2 where the prefixes B and D appended to the numbers indicate that the numbers are expressed in the binary and decimal formats respectively.

(5) Since the MN (S) of 0 is within the range 0 to 2, the MV (S) is judged to be included in the window.

SUMMARY OF THE INVENTION

It is thus an object of the present invention addressing the problem described above to provide a communication control apparatus having a window control function and a control apparatus having a window control function that are capable of forming complicated judgment processing simple.

In accordance with an aspect of the present invention, there is provided a control apparatus having a window control function, the apparatus characterized by being further provided with a distance computation means for computing a signed n-bit distance as a result of subtraction of a second sequence number cyclically updated to vary like a modulo-N number from a first sequence number cyclically updated to vary like a modulo-N number where N is a positive integer greater than 1 and the nth power of 2 is greater than N ($2^n > N$); a lowest-order-bit extraction means for extracting m lowest-order bits of the distance where the mth power of 2 is equal to N ($2^m = N$); and a distance judgment means for forming a judgment as to whether or not the first sequence number is within a window set with the second sequence number used as a reference by comparison of the m lowest-order bits of the distance extracted by the lowest-order-bit extraction means with the size of the window.

In accordance with another aspect of the present invention, there is provided a communication control apparatus having a window control function, the apparatus characterized by being further provided with a data reception means for receiving data including a first sequence number MN (S) cyclically updated to vary like a modulo-N number where N is a positive integer greater than 1; a distance computation means for computing a signed n-bit distance as a result of subtraction of a second sequence number MV (R) cyclically updated to vary like a modulo-N number from the first sequence number MN (S) where the nth power of 2 is greater than N ($2^n$>m) wherein the second sequence number MV (R) is an expected number supposed to be included in data to be received next; a lowest-order-bit extraction means for extracting m lowest-order bits of the distance where the mth power of 2 is equal to N ($2^m$×N); a distance judgment means for forming a judgment as to whether or not the first sequence number MN (S) is within a window set with the second sequence number MV (R) used as a reference by comparison of the m lowest-order bits of the distance extracted by the lowest-order-bit extraction means with the size of the window; a mark appending means for appending an acceptance-confirmation mark to the data including the first sequence number MN (S) if the first sequence number MN (S) is within the window; a data control mark for discarding the data including the first sequence number MN (S) if the first sequence number MN (S) is not within a window; and a number updating means for updating the second sequence number MV (R) as a modulo-N number on the basis of the acceptance-confirmation mark if the second sequence number MV (R) expected to be received next is equal to the first sequence number MN (S) included in the data received by the data reception means.

In accordance with a further aspect of the present invention, there is provided a communication control apparatus having a window control function, the apparatus characterized by being further provided with a data reception means for receiving delivery confirmation data including a first sequence number MN (S) and used for showing delivery confirmation from a reception side; a distance computation means for computing a signed n-bit distance as a result of subtraction of a second sequence number MV (T) from the first sequence number MN (S) where the nth power of 2 is greater than N ($2^n$>N) if the first sequence number MN (S) received by the data reception means is not equal to the second sequence number MV (T) wherein the second sequence number MV (T) is a number expected to be included in delivery confirmation data received from the reception side to indicate delivery confirmation; a lowest-order-bit extraction means for extracting m lowest-order bits of the distance where the mth power of 2 is equal to N ($2^m$×N); a distance judgment means for forming a judgment as to whether or not the first sequence number MN (S) is within a window set with the second sequence number MV (T) used as a reference by comparison of the m lowest-order bits of the distance extracted by the lowest-order-bit extraction means with the size of the window; a mark appending means for appending a received-delivery-confirmation mark to the delivery confirmation data including the first sequence number MN (S) if the first sequence number MN (S) is within the window; and a number updating means for updating the second sequence number MV (T) as a modulo-N number on the basis of the received-delivery-confirmation mark if the first sequence number MN (S) received by the data reception means is equal to the second sequence number MV (T) wherein the second sequence number MV (T) is a number expected to be included in delivery confirmation data to be received next from the reception side to indicate delivery confirmation.

The above and other objects, features and advantages of the present invention and the manner of realizing them will become more apparent, and the invention itself will be best understood from a study of the following description and appended claims with reference to the attached drawings showing some preferred embodiments of the invention.

DETAILED DESCRIPTION OF THE PREFERRED EMBODIMENT

Figure 1:
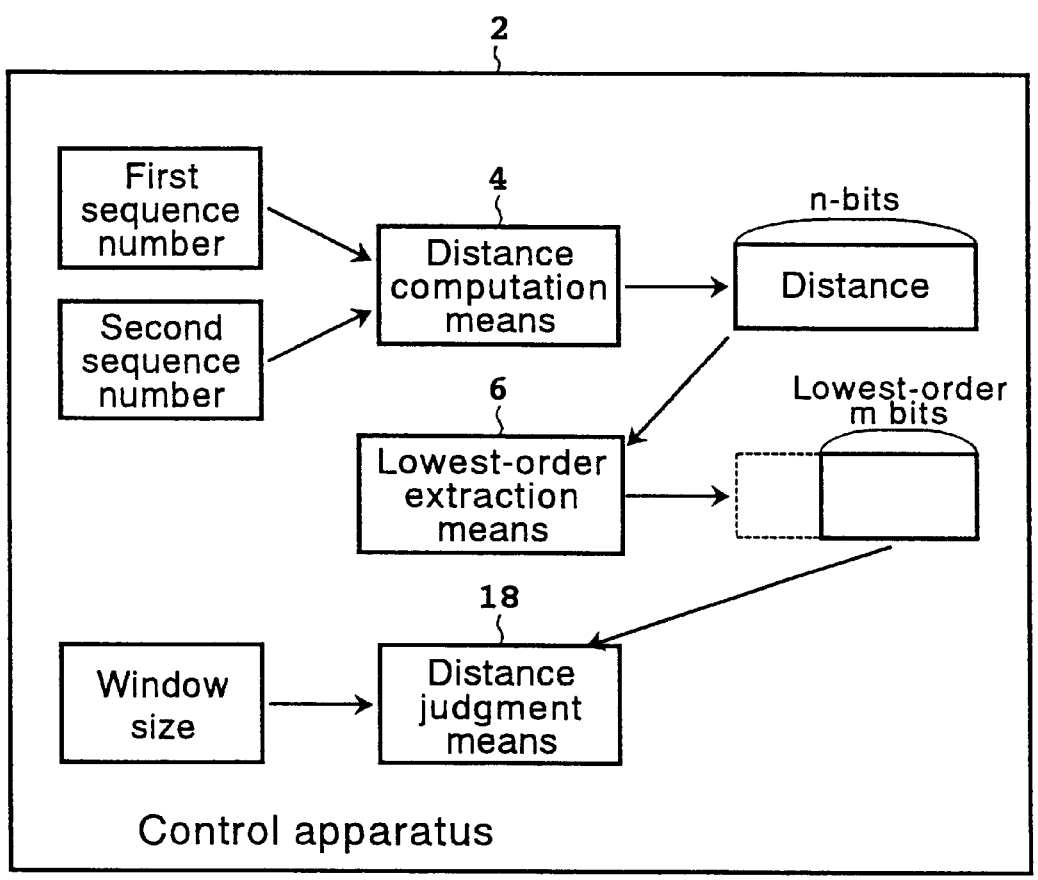
FIG. 1 is a diagram showing the principle of the present invention.

Before explaining a preferred embodiment of the present invention, the principle of the present invention is described. FIG. 1 is a diagram showing the principle of the present invention. As shown in the figure, a control apparatus 2 comprises:

a distance computation means 4 for computing a signed n-bit distance as a result of subtraction of a second sequence number cyclically updated to vary like a modulo-N number from a first sequence number also cyclically updated to vary like a modulo-N number where N is a positive integer greater than 1;

a lowest-order-bit extraction means 6 for extracting m lowest-order bits of the distance where the mth power of 2 is equal to N ($2^m$=N); and a distance judgment means 18 for forming a judgment as to whether or not the first sequence number is within a window set with the second sequence number used as a reference by comparison of the m lowest-order bits of the distance extracted by the lowest-order-bit extraction means 6 with the size of the window.

Figure 2:
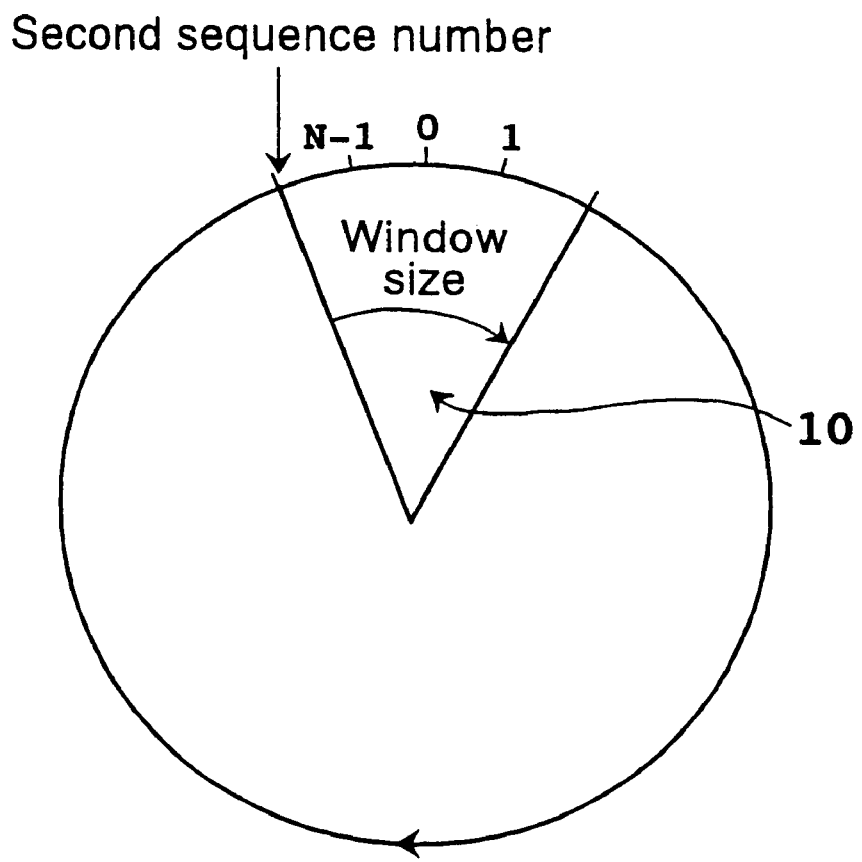
FIG. 2 is a diagram showing a window defined in this specification.

FIG. 2 is a diagram showing the window cited above. The operation of the control apparatus shown in FIG. 1 is explained by referring to FIG. 2 as follows. As shown in FIG. 2, numbers in the range 0 to (N−1) are each put as a mark along the circumference of a circle in an ascending order in the clockwise direction. A window 10 is an area obtained as a result of a rotation starting from a second sequence number in the clockwise direction over a sector referred to as a window size. The control apparatus 2 forms a judgment as to whether a first sequence number is in the window 10 as follows. The first and second sequence numbers are each an n-bit positive integer which is updated cyclically as a modulo-N number where n is a positive integer which gives an nth power of 2 greater than N ($2^n$>N). The distance computation means 4 computes an n-bit distance as a result of subtraction of the second sequence number from the first sequence number. Since the first and second sequence numbers are each a number in the range 0 to (N−1), the resulting distance is an integer with a sign bit and an absolute value also in the range 0 to (N−1). The lowest-order-bit extraction means 6 extracts m lowest-order bits from the difference.

For the distance equal to or greater than 0, the all the n bits thereof are the same as its m lowest-order bits. This is because higher-order bits than the m bits are all 0 as long as the value of the distance is smaller than the mth power of 2. In this case, a judgment on the distance can be formed simply by using the m lowest-order bits extracted by the lowest-order-bit extraction means 6.

Consider the following negative distance using the 2's complement format as an example. As described above, N is equal to the kth power of 2 where k=m. Assume for example that N=4,096, k=12, the first sequence number is 0 and the second sequence number is 4,090. In the circle shown in FIG. 2, the distance is a length of an arc on the circumference between the second sequence number of 4,090 and the first sequence number which is 0 in this example. By calculation, the distance is 0−4,090 =H'FFFFF 006' where H'FFFFF006' is a number expressed in the 2's complement format. It is obvious that, by using the 2's complement format, the 12 lowest-order bits have a value of 006 which represents the length from the second sequence number to the first sequence number. It is obvious that, with the 1's complement format used, the m lowest-order bits is smaller than the 2's complement expression by a difference of 1 and thus do not correctly represent the distance. That is to say, if the 1's complement format is used, the distance must be examined to determine whether the distance is positive or negative and, if the distance is found negative, it is necessary to add an offset of 1 to the m lowest-order bits of the distance expressed in the 1's complement format in order to find a correct value of the distance from the first sequence number to the second sequence number. That is to say, in the case of the 1's complement expression, it is necessary to add a step of forming a judgment as to whether the distance is positive or negative and a step of adding the offset to a negative distance to the algorithm based on the 2's complement format.

In addition, if a modulo value N satisfying the relations $2(K-1)<N<2^k$ is used, the use of the m lowest-order bits in the formation of the judgment offers the following merit for a negative distance. In the expression of the distance using the 2's complement format, the m lowest-order bits represent the distance from the second sequence number to the first sequence number minus ($2^k$ −N). Thus, the distance from the second sequence number to the first sequence number can be found by adding an offset of ($2^k$ −N) to the m lowest-order bits. This technique is also applicable to the computation of a distance by using numbers expressed in the 1's complement format.

The distance judgment means 8 compares the distance with the size of the window to form a judgment as to whether or not the first sequence number is within the window. In this way, the processing to form such a judgment can be made simpler. The present invention can be applied to a control apparatus including processing to form such a judgment as to whether a first sequence number updated cyclically as a modulo-N number is within a window set by using a second sequence number also updated cyclically as a modulo-N number as a reference.

Figure 3:
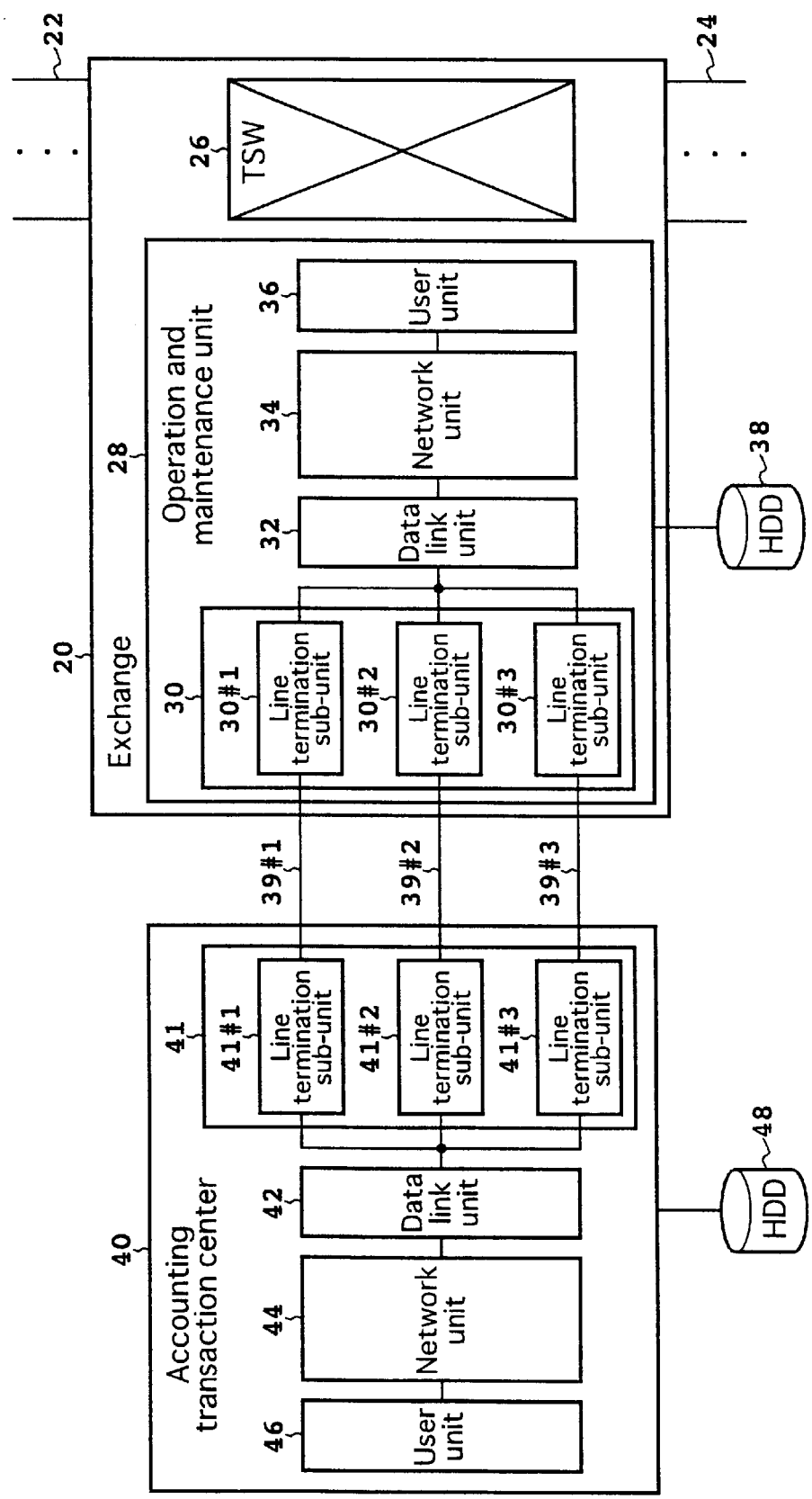
FIG. 3 is a diagram showing the configuration of a communication system implemented by an embodiment of the present invention.

An embodiment of the present invention exemplifies a case in which the invention is applied to a communication control apparatus. FIG. 3 is a diagram showing the configuration of a communication system implemented by the embodiment of the present invention. The communication control apparatus adopts typically the MLP of a packet network whereby a receiver carries out processing to form a judgment as to whether or not the sequence number of a frame received from a transmitter is within a window set by using the expected sequence number supposed to be included in a frame to be received next from the transmitter as a reference, whereas the transmitter carries out processing to form a judgment as to whether or not a sequence number of a frame to be transmitted next is within a window set by using the sequence number of the frame to be confirmed next by the receiver as a reference.

As shown in FIG. 3, in this embodiment, the transmitter and the receiver are implemented by an exchange 20 and an accounting center 40 respectively. The exchange 20 comprises a plurality of input lines 22, a plurality of output lines 24, a TSW (Telephone Switch) 26 and an operation and maintenance unit 28. The input and output lines 22 and 24 are each connected to another exchange or a terminal. The TSW 26 carries out cross-connection processing to pass on data received from an input line 22 to an appropriate output line 24. The operation and maintenance unit 28 carries out the operation and facilitates maintenance of the exchange 20. For example, the operation and maintenance unit 28 transmits information on accounting such as connection and disconnection time of a call, the calling user and the called user to the accounting transaction center 40 in accordance with the MLP. To accomplish the function to transmit information on accounting to the accounting transaction center 40, the operation and maintenance unit 28 is provided with a termination assembly unit 30, a data link unit 32, a network unit 34 a user unit 36 and an HDD (Hard-Disc Drive) 38. The termination assembly unit 30 terminates a physical interface with transmission lines 39#i, where i=1 to 3, connected to the accounting center 40. In order to implement the MLP, the termination assembly unit 30 is provided with a plurality of line termination sub-units 30#i, where i=1 to 3, connected to the same plurality of transmission lines 39#i, where i=1 to 3. Each of the line termination sub-units 30#i, where i=1 to 3, reads out pieces of frame data from a shared transmission buffer 76 in the data link unit 32, putting them onto a queue before transmitting the data to the accounting transaction center 40 by way of the corresponding transmission line 39#i in accordance with a predetermined physical interface. On the other hand, a line termination sub-unit 30#i receives ACK (ACKnowledgement) data from the corresponding transmission line 39#i, writing the data into a shared ACK data buffer 50.

Figure 4:
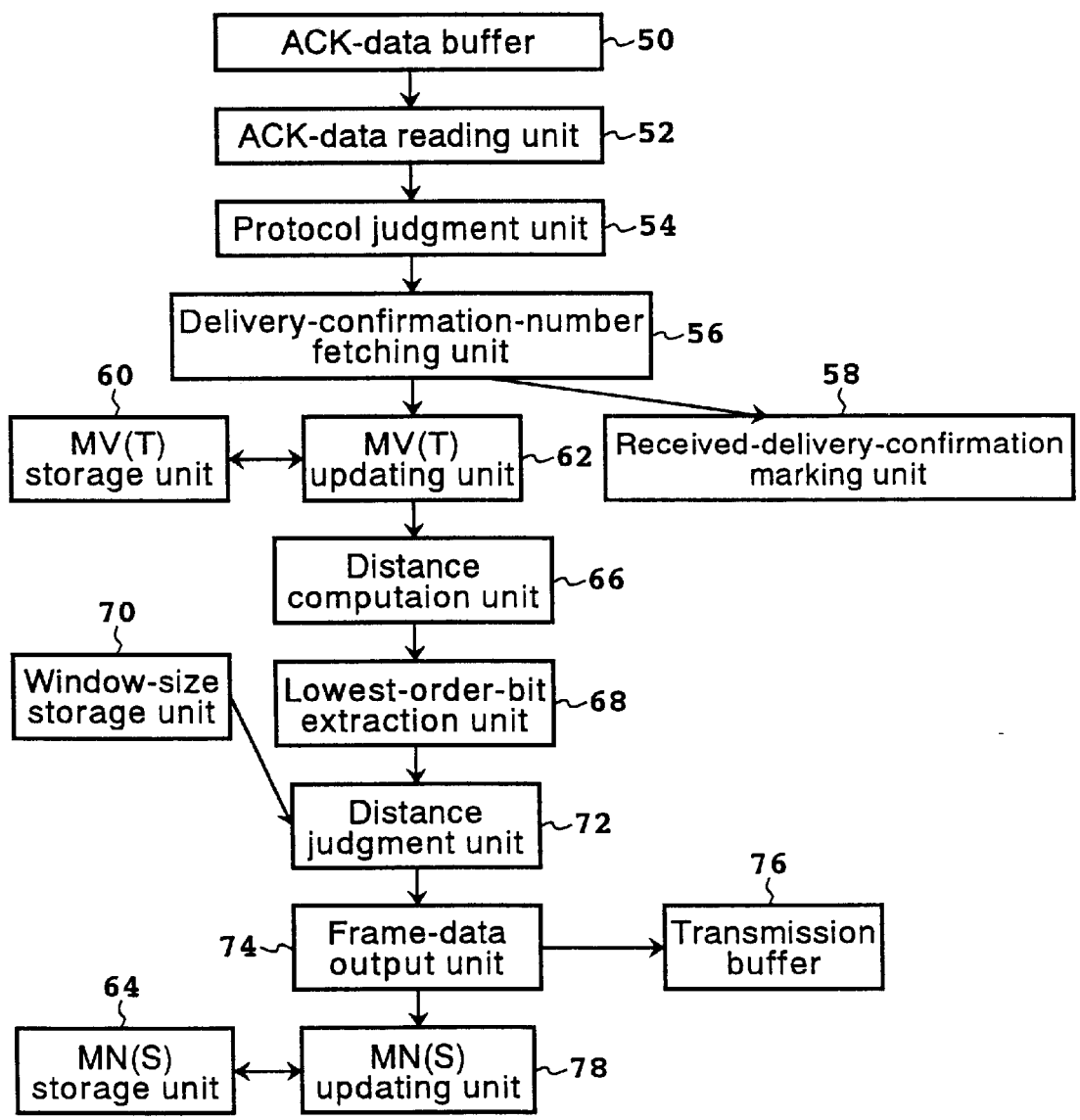
FIG. 4 is a functional block diagram showing a data link unit of an exchange employed in the communication system shown in FIG. 3.

FIG. 4 is a functional block diagram showing the data link unit 32 employed in the exchange 20 of the communication system shown in FIG. 3. As shown in FIG. 4, the data link unit 32 comprises the shared ACK-data buffer 50, an ACK-data reading unit 52, a protocol judgment unit 54, a delivery-confirmation-number fetching unit 56, a received-delivery-confirmation marking unit 58, an MV (T) storage unit 60, an MV (T) updating unit 62, an MN (S) storage unit 64, a distance computation unit 66, a lowest-order-bit fetching unit 68, a window-size storage unit 70, a distance judgment unit 72, a frame-data output unit 74, a shared transmission unit 76 and an MN (S) updating unit 78. The HDD 38 shown in FIG. 3 is used for storing a program to be executed by typically a 32-bit processor which is shown in none of the figures. The ACK-data buffer 50 is a buffer used for storing ACK data received from the accounting transaction center 40 on the receiver side. The ACK-data reading unit 52 reads out ACK data from the ACK-data buffer 50. The protocol judgment unit 54 determines the type of the protocol from the ACK data and controls the protocol. An example of the type of the protocol is the X25 type. The type of the protocol needs to be determined since protocols other than X25 are also supported in accordance with a request made by the user unit 36.

The delivery-confirmation-number fetching unit 56 fetches a delivery confirmation number Mv (S) from the ACK data. The received-delivery-confirmation marking unit 58 appends a mark to indicate that a delivery confirmation number MV (S) received from the accounting transaction center 40 on the receiver side has been accepted if the delivery confirmation number MV (S) is found larger than the expected sequence number MV (T) of the frame, where the sequence number MV (T) is the expected delivery confirmation number; supposed to be rendered delivery confirmation next by the reception side. The MV (T) storage unit 60 is a 32-bit variable area for storing the expected delivery confirmation number MV (T). The MV (T) updating unit 62 updates the expected delivery confirmation number MV (T) as a modulo-N number on the basis of the received-delivery-confirmation mark if the delivery confirmation number MV (S) is found equal to the expected delivery confirmation number MV (T). It should be noted that, in this embodiment, the modulo value N is set at $2^{12}=4,096$. The MN (S) storage unit 64 is a 32-bit variable area for storing the sequence number MN (S) of a frame to be transmitted next to the accounting center 40 on the receiver side. Upon initialization, the MN (S) storage unit 64 is set at an initial value of 0. The sequence number MN (S) is a transmission sequence number which is set in a frame and incremented cyclically as a modulo-4,096 number. The distance computation unit 66 computes a distance as a result of subtraction of the expected delivery confirmation number MV (T) from the delivery confirmation number MV (S), storing the signed distance in a 32-bits variable area. A negative value of the distance {MV (S)–MV (T)} is always expressed in the 2's complement format. The lowest-order-bit extraction unit 68 extracts typically 12 lowest-order bits from the 32-bits distance {MV (S)–MV (T)} by storing only the lowest-order bits of the 32-bits distance {MV (S)–MV (T)} in a 12-bits storage area. The number of extracted bits is k where k satisfies the equation $N=2^k$.

The window-size storage unit 70 is a variable area for storing the window size MW. In this example, the window size MW is set at a typical value of 8. The distance judgment unit 72 compares the 12 lowest-order bits of the distance {MV (S)–MV (T)} with the window size MW. If the 12 lowest-order bits of the distance {MV (S)–MV (T)} is found smaller than the window size MW, the delivery confirmation number MV (S) is determined to be inside the window. If the 12lowest-order bits of the distance {MV (S)–MV (T)} is found greater than or equal to the window size MW, on the other hand, the delivery confirmation number MV (S) is determined to be outside the window. The frame-data transmission unit 74 sets the sequence number MN (S) in frame data output by the network unit 34 employed in the exchange 20 as shown in FIG. 3, writing the frame data including the transmission sequence number MN (S) into the transmission buffer 76. Used for temporarily storing data to be transmitted to the accounting center 40, the transmission buffer 76 is a buffer common to the line termination sub-units 30#i where i=1 to 3. The MN (S) updating unit 78 increments the transmission sequence number MN (S) cyclically as a modulo-4,096 number.

The network unit 34 shown in FIG. 3 renders services at a network layer of the OSI specifications. The user unit 36 shown in FIG. 3 collects pieces of information on accounting and outputs them to the network unit 34. The HDD 38 includes a hard disc for storing programs for the data link unit 32, the network unit 34 and the user unit 36.

On the other hand, the accounting center 40 comprises a termination assembly unit 41, a data link unit 42, a network unit 44, a user unit 46 and an HDD 48. The termination assembly unit 41 terminates a physical interface with the transmission lines 39#i, where i=1 to 3, connected to the exchange 20. In order to implement the MLP, the termination assembly unit 41 is provided with a plurality of line termination sub-units 41#i, where i=1 to 3, connected to the same plurality of transmission lines 39#i, where i=1 to 3. Each of the line termination sub-units 41#i, where i=1 to 3, receives frame data from the respective transmission line 39#i, where i=1 to 3, storing the data into a memory used as a shared reception buffer 80. The line termination sub-unit 41#i also transfers the transmission sequence number MN (S) included in the frame data to ACK data and transmits the ACK data to the exchange 20 through the line transmission 39#i in accordance with a predetermined interface.

Figure 5:
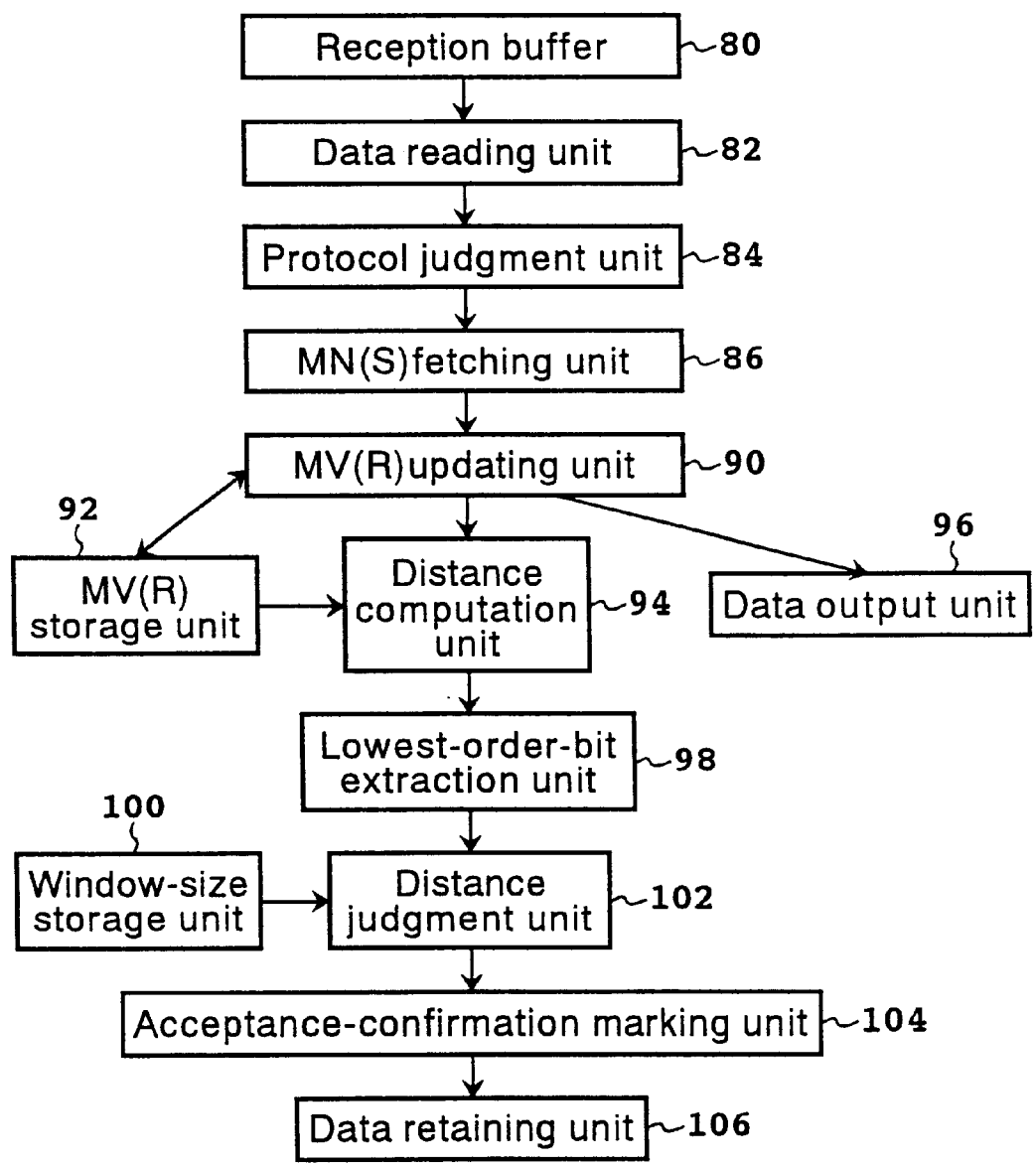
FIG. 5 is a functional block diagram showing a data link unit of an accounting transaction center employed in the communication system shown in FIG. 3.

FIG. 5 is a functional block diagram showing the data link unit 42 of the accounting center 40 employed in the communication system shown in FIG. 3. As shown in FIG. 5, the data link unit 42 comprises the shared reception buffer 80, a data reading unit 82, a protocol judgment unit 84, an MN (S) fetching unit 86, an MV (R) updating unit 90, an MV (R) storage unit 92, a data output unit 96, a distance computation unit 94, a lowest-order-bit fetching unit 98, a window-size storage unit 100, a distance judgment unit 102, an acceptance-confirmation marking unit 104 and a data retaining unit 106. The HDD 48 cited above is used for storing programs to be executed typically by a 32-bits processor not shown in the figure. Used for storing frame data received by the line termination sub-units 41#i, where i=1 to 3, from the exchange 20, the reception buffer 80 is a buffer common to the termination sub-units 41#i where i=1 to 3. The data reading unit 82 reads out pieces of frame data sequentially from the reception buffer 80. The protocol judgment unit 84 determines the type of the protocol from the frame data and controls the protocol. An example of the type of the protocol is the X25 type. The MN (S) fetching unit 86 fetches a sequence number MN (S) from the frame data. The MV (R) storage unit 92 is a variable area for storing the expected sequence number MV (R). The expected sequence number MV (R) is a sequence number supposed to be included in frame data to be received next. The MV (R) updating unit 90 compares the sequence number MN (S) with the expected sequence number MV (R) and updates the expected sequence number MV (R) as a modulo-4096 number on the basis of a received-delivery-confirmation mark if the sequence number MN (S) is found equal to the expected sequence number MV (R). In this case, the MV (R) updating unit 90 calls the data output unit 96. If the sequence number MN (S) is found unequal to the expected sequence number MV (R), on the other hand, the distance computation unit 94 is called.

As described above, the MV (R) storage unit 92 is a 32-bits variable area for storing the expected sequence number MV (R) of the frame to be received next. The distance computation unit 94 computes a distance as a result of subtraction of the expected sequence number MV (R)

from the sequence number MN (S), storing the signed distance in a 32-bits variable area. A negative distance {MN (S)–MV (R)} is always expressed in the 2's complement format.

The data output unit 96 outputs the received frame data including the sequence number MN (S) and frame data saved by the data retaining unit 106 to the network unit 44 shown in FIG. 3. The lowest-order-bit. extraction unit 98 extracts typically 12lowest-order bits from the 32-bit distance {MN (S)–MV (R)} by storing only the lowest-order bits of the 32-bits distance {MN (S)–MV (R)} in a 12-bits storage area. The window-size storage unit 100 is a variable area for storing the window size MW. In this example, the window size MW is set at a typical value of 8. The distance judgment unit 102 compares the 12lowest-order bits of the distance {MN (S)–MV (R)} with the window size MW. If the 12lowest-order bits of the distance {MN (S)–MV (R)} is found smaller than the window size MW, the sequence number MN (S) is determined to be within the window. If the 12lowest-order bits of the distance {MN (S)–MV (R)} is found greater than or equal to the window size MW, on the other hand, the sequence number MN (S) is determined to be out of the window. In this case, the frame data is discarded. The acceptance-confirmation marking unit 104 appends a mark to the frame data to indicate that the frame data including the sequence number MN (S) received from the exchange 20 has already been accepted. The data retaining unit 106 stores the frame data with the sequence number MN (S) received from the exchange 20 in a memory.

Figure 6:
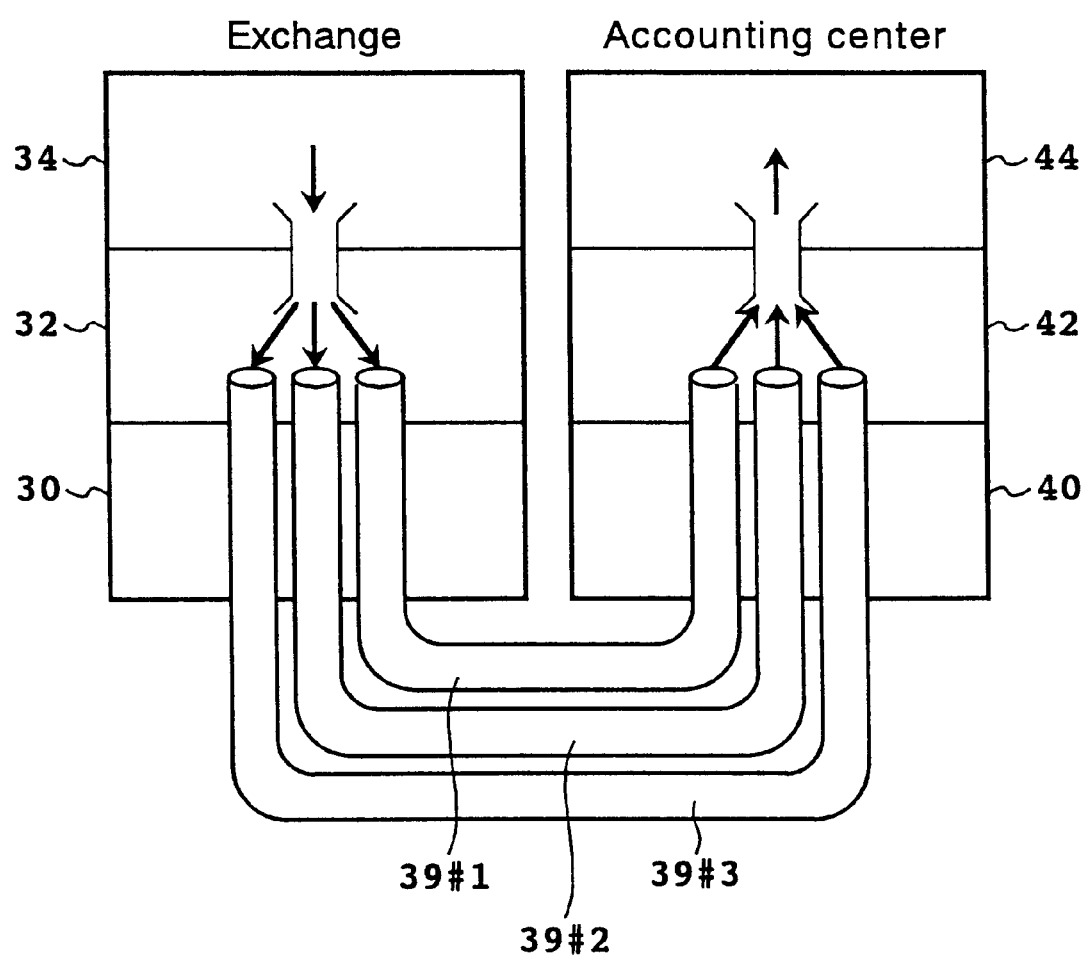
FIG. 6 is a diagram showing flows of data from the exchange to the accounting center.
Figure 7:
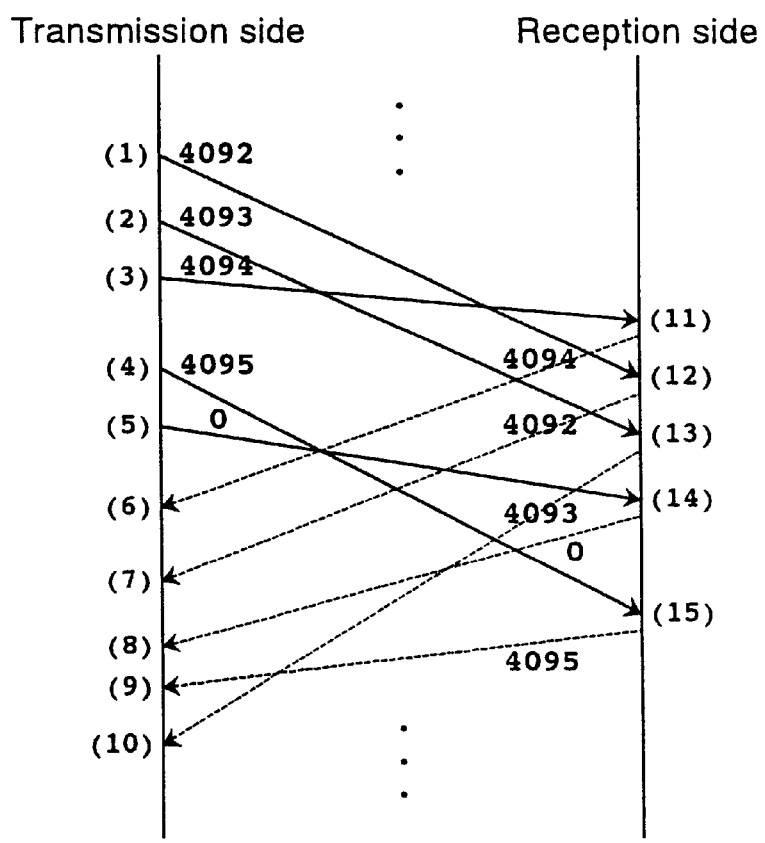
FIG. 7 is a diagram showing a sequence of transmissions and receptions of frames.

FIG. 6 is a diagram showing flows of data and FIG. 7 is a diagram showing a sequence of transmissions of frames from the exchange 20 to the accounting center 40 and transmissions of acknowledgment data from the accounting center 40 to the exchange 20 to acknowledge receptions of the frames. The operation of the communication system shown in FIG. 2 is explained as follows.

(A) Operation of the Operation and Maintenance Unit 28

Figure 8:
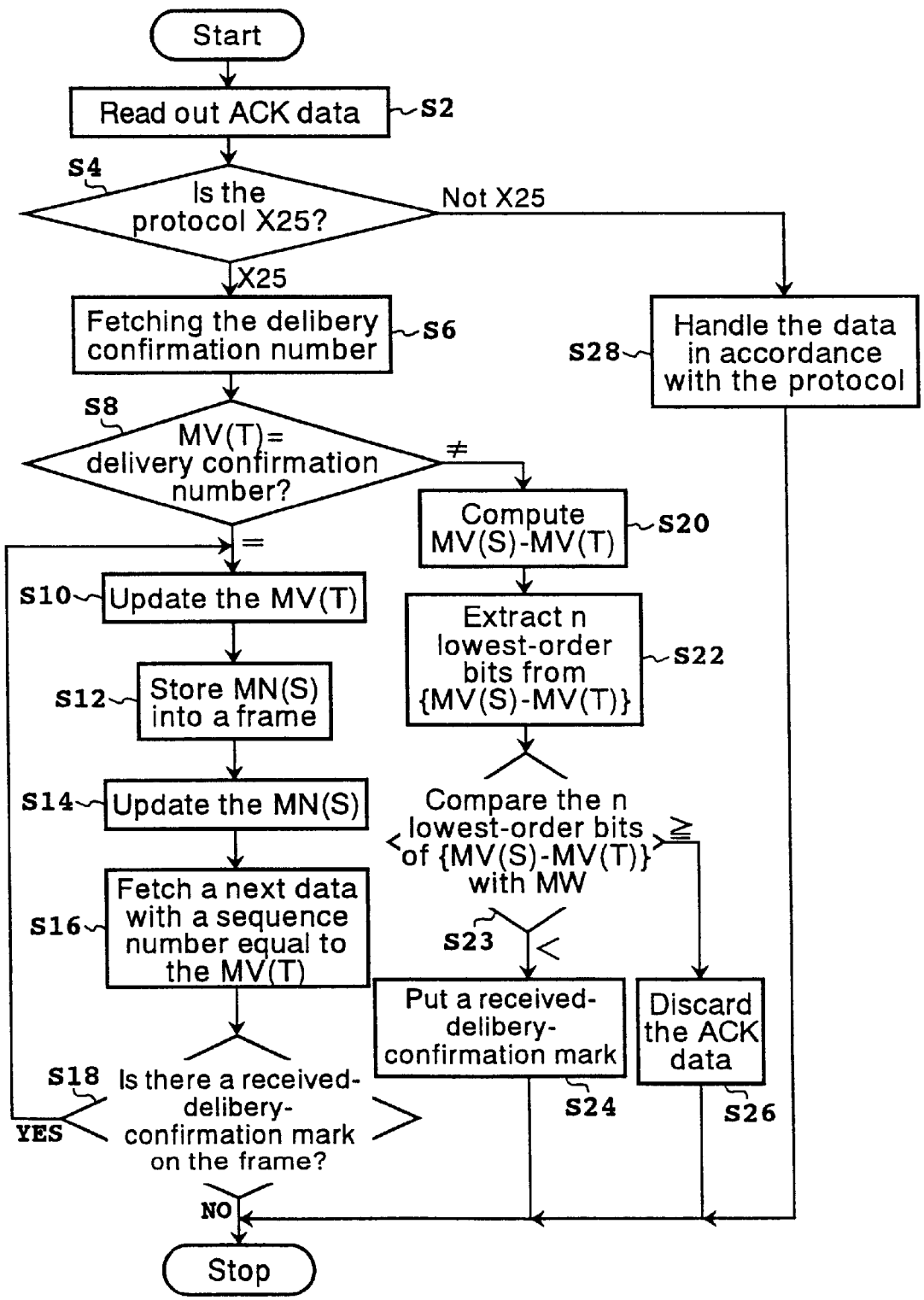
FIG. 8 is a flowchart representing the operation of the data link unit shown in FIG. 4.
Figure 9:
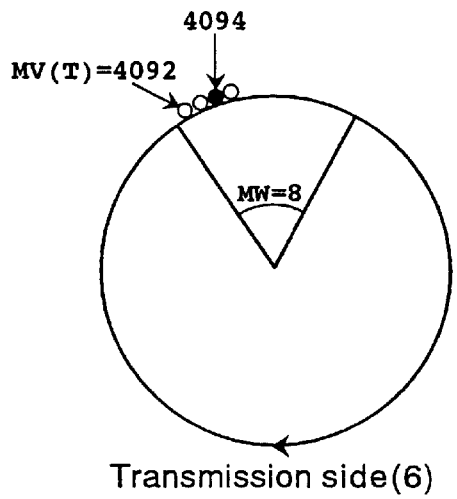
FIG. 9 is a diagram showing a shifting window on the transmission side.
Figure 9:
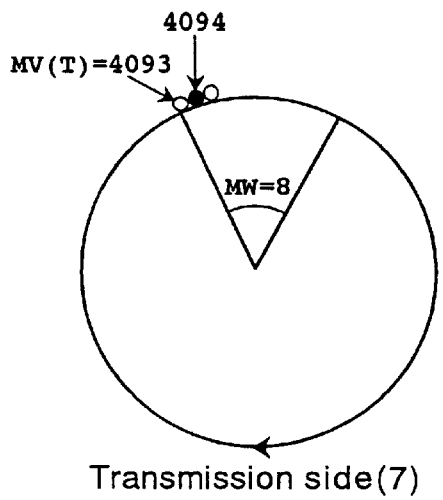
Figure 9:
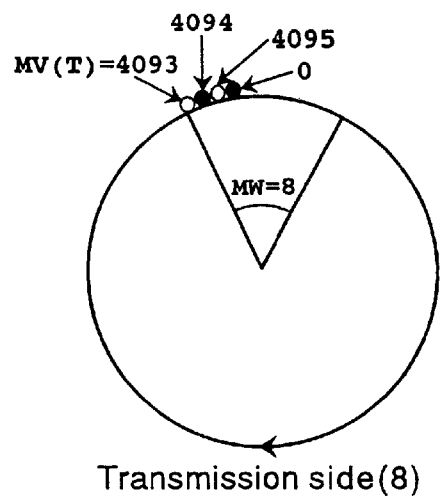
Figure 9:
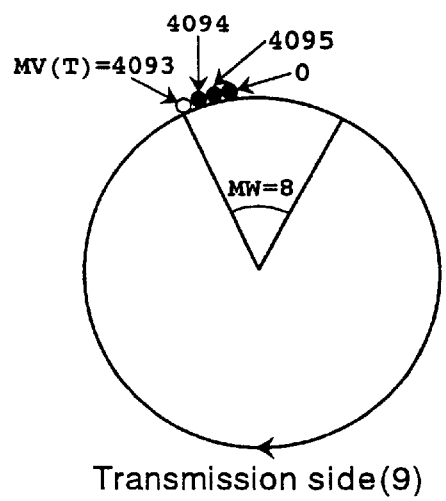
Figure 9:
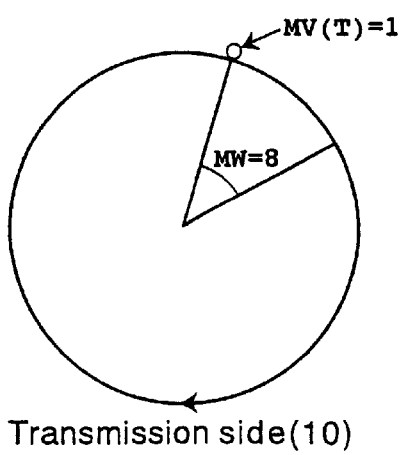

FIG. 8 is a flowchart representing the operation of the data link unit 32 shown in FIG. 4 and FIG. 9 is a diagram showing a shifting window on the transmission side. Upon system initialization, the operation and maintenance unit 28 initializes the expected delivery confirmation number MV (T) stored in the MV (T) storage unit 60 and the delivery confirmation number MV (S) stored in the MV (S) storage unit 64 both at 0, as well as clears the ACK-data buffer 50 and the transmission buffer 76 both to 0. When a telephone terminal connected to an input line 22 makes a call, the exchange 20 controls the call and stores information on accounting in the HDD 38. The information on accounting includes the user of the telephone terminal making the call, a line connection time, the user receiving the call and a line disconnection time. The user unit 36 employed in the operation and maintenance unit 28 requests the network unit 34 to establish a connection with the accounting transaction center 40.

The network unit 34 forms a link at a network layer in the X25 protocol in conjunction with the network unit 44 employed in the accounting transaction center 40. By the same token, the data link unit 32 forms a link at a data link layer in the X25 protocol in conjunction with the data link unit 42 employed in the accounting transaction center 40. The user unit 36 reads out information on accounting from the HDD 38, supplying the information to the network unit 34. As shown in FIG. 6, the network unit 34 splits the information received from the user unit 36 into packets and supplies frame data to the data link unit 32.

As will be described later, if a delivery confirmation number MV (S) received from the accounting center 40 matches the expected delivery confirmation number MV (T), the data link unit 32 sets information on the X25 protocol and a transmission sequence number MN (S) in the frame, outputting the frame to the transmission buffer 76, and updates the transmission sequence number MN (S). This processing is repeated for each incoming frame till the transmission sequence number MN (S) becomes equal to the limit of a window which is set with the expected delivery confirmation number MV (T) taken as a reference. The line termination sub-units 30#i where i=1 to 3 read out pieces of frame data sequentially from the transmission buffer 76 and outputs the pieces of frame data to the transmission lines 39#i respectively where i=1 to 3. As will be described later, the line termination sub-units 41#i employed in the accounting transaction center 40, where i=1 to 3, output pieces of ACK data each including a delivery confirmation number MV (S), which is a copy of a transmission sequence number MN (S) included in a piece of frame data, to the exchange 20 by way of the transmission lines 39#i. The pieces of ACK data each including a delivery confirmation number MV (S) are received by the data link unit 32 employed in the exchange 20 through the transmission lines 39#i and the line termination sub-units 30#i. The data link unit 32 updates the expected delivery confirmation number MV (T) and controls the transmission of frame data to the accounting transaction center 40 after verifying the proper relations among a delivery confirmation number MV (S) included in ACK data, the transmission sequence number MN (S) of a frame to be transmitted next, the expected delivery confirmation number MV (T) and the window size MW. In this way, pieces of frame data output by the exchange 20 in accordance with the MLP are received by the accounting transaction center 40 as shown in FIG. 6.

Cases 1 to 10 described below are used to exemplify the operation of the data link 32 employed in the operation and maintenance unit 28.

Case 1: Refer to the flowchart of FIG. 8 which represents the operation of the data link unit 32. In this case, assume that the expected delivery confirmation number MV (T) is 4,084, the transmission sequence number MN (S) is 4,092 and ACK data including a delivery confirmation number MV (S) of 4,084 is received from the reception side by the exchange 20 on the transmission side in which the ACK data is stored into the ACK-data buffer 50 by the termination assembly unit 30#i. At a step S2 of the flowchart shown in FIG. 8, the ACK-data reading unit 52 reads out ACK data from the ACK-data buffer 50. Next, at a step a step S4, the protocol judgment unit 54 forms a judgment as to whether or not the protocol of the ACK data is X25. If the protocol is X25, the flow of the processing goes on to a step S6. If the protocol is not X25, on the other hand, the flow of the processing goes on to a step S28. In this case, the protocol is assumed to be X25. Thus, the flow of the processing goes on to the step S6. It should be noted that, for a protocol other than X25, the data is linked in accordance with the protocol at the step S28. At the step S6, the delivery-confirmation-number fetching unit 56 fetches a delivery confirmation number MV (S) which is 4,084 as described above. Subsequently, at a step S8, the MV (T) updating unit 62 reads out the expected delivery confirmation number MV (T), which is also 4,084 as described above, from the MV (T) storage unit 60 and compares the expected delivery confirmation number MV (T) with the delivery confirmation number MV (S) which is also 4,084. Since the expected delivery confirmation number MV (T) is found equal to the delivery confirmation number MV (S), the flow of the processing goes on to a step S10.

At the step S10, the MV (T) updating unit 62 updates the expected delivery confirmation number MV (T) as a modulo-4,096 number. In this case, the expected delivery confirmation number MV (T) is incremented to 4,085. Then, at a step S12, the frame-data output unit 74 stores a frame with a transmission sequence number MN (S) of 4,092 into the transmission buffer 76. The frame data with a transmission sequence number MN (S) of 4,092 stored in the transmission buffer 76 is then output to a transmission line 39#i by way of the termination assembly unit 30#i. Subsequently, at a step S14, the MN (S) updating unit 78 updates the transmission sequence number MN (S) as a modulo-4,096 number. In this case, the transmission sequence number MN (S) is incremented to 4,093. Then, at a step S16, a next frame having the a transmission sequence number MN (S) equal to the updated expected delivery confirmation number MV (T) of 4,085 is obtained. Subsequently, at a step S18, the frame data with the transmission sequence number MN (S) of 4,085 is checked to form a judgment as to whether or not the frame data includes a mark indicating that the delivery confirmation of the frame has already been received by the exchange 20 on the transmission side from the accounting center 40 on the reception side. If such a mark is included, the flow of the processing goes back to the step S10. If such a mark is not included, on the other hand, the processing is ended. In this case, it is assumed that the frame data with the transmission sequence number MN (S) of 4,085 does not include a mark indicating that the delivery confirmation of the frame has already been received by the exchange 20 on the transmission side. Thus, the processing is ended.

Case 2: Now, assume that the expected delivery confirmation number MV (T) has already been updated to a value of 4,085, the transmission sequence number MN (S) has also been updated to a value of 4,093 and ACK data including a delivery confirmation number MV (S) of 4,085 is this time received by the exchange 20 on the transmission side from the accounting transaction center 40 on the reception side. This case is processed in the same way as Case 1 described above. To put it in detail, in the processing of the steps S2 to S18, the frame with a transmission sequence number MN (S) of 4,093 is put in the transmission buffer 76, the expected delivery confirmation number MV (T) and the transmission sequence number MN (S) are updated to 4,086 and 4,094 respectively.

Case 3: The expected delivery confirmation number MV (T) has already been updated to a value of 4,086, the transmission sequence number MN (S) has also been updated to a value of 4,094 and ACK data including a delivery confirmation number MV (S) of 4,086 is received by the exchange 20 on the transmission side from the accounting center 40 on the reception side. In this case, during the processing of the steps S2 to S18, the frame with a transmission sequence number MN (S) of 4,094 is put in the transmission buffer 76. Case 4: The expected delivery confirmation number MV (T) has already been updated to a value of 4,087, the transmission sequence number MN (S) has also been updated to a value of 4,095 and ACK data including a delivery confirmation number MV (S) of 4,087 is received by the exchange 20 on the transmission side from the accounting center 40 on the reception side. In this case, during the processing of the steps S2 to S18, the frame with a transmission sequence number MN (S) of 4,095 is put in the transmission buffer 76. Case 5: The expected delivery confirmation number MV (T) has already been updated to a value of 4,088, the transmission sequence number MN (S) has also been updated to a value of 0 and ACK data including a delivery confirmation number MV (S) of 4,088 is received by the exchange 20 on the transmission side from the accounting center 40 on the reception side. In this case, during the processing of the steps S2 to S18, the frame with a transmission sequence number MN (S) of 0 is put in the transmission buffer 76.

The transmissions of the frames with transmission sequence numbers MN (S) of, 4,092, 4,093, 4,094, 4,095 and 0 are shown in FIG. 7.

Cases 6 to 10 below are explained by referring to diagrams for transmission sides (6) to (10) of FIG. 9 respectively in addition to the flowchart shown in FIG. 8 as follows.

Case 6: With the expected delivery confirmation number MV (T) updated to 4,092, ACK data with a delivery confirmation number MV (S) of 4,094 is received by the exchange 20 on the transmission side from the accounting center 40 on the reception side as shown in the diagram of FIG. 9 for transmission side (6). By carrying out the pieces of processing of the steps S2 to S6 in the flowchart shown in FIG. 8, the delivery confirmation number MV (S) of 4,094 is fetched from ACK data read out from the ACK-data buffer 50. At the step S8, the delivery confirmation number MV (S) of 4,094 is compared with the expected delivery confirmation number MV (T) of 4,092. Since the delivery confirmation number MV (S) is not equal to the expected delivery confirmation number MV (T), the flow of the processing goes on from the step S8 to a step S20 at which the distance computation unit 66 computes a distance {MV (S)–MV (T)} as a result of subtraction of the expected delivery confirmation number MV (T) from the delivery confirmation number MV (S). In this case, the distance {MV (S)–MV (T)} is found to be 4,094–4,092=2. Then, at a step S22, the lowest-bit fetching unit 68 extracts 12lowest-order bits from the 32-bits signed distance {MV (S)–MV (T)} by storing the distance {MV (S)–MV (T)} into a 12-bits variable area x. In this case, the 12lowest-order bits have a value of H'002'. Subsequently, at a step S23, the distance judgment unit 72 reads out the window size MW (=8 in this example) from the window-size storage unit 70 and compares the window size MW of 8 with the value of 2 stored in the variable area x. Since the variable x (=2)<the window size (MW=8), the delivery confirmation number MV (S) is determined to be within the window. In this case, the flow of the processing goes on to a step S24. If the value x representing the 12 lowest-order bits from the 32-bits signed distance {MV (S)–MV (T)} is found greater than or equal to the window size MW, on the other hand, the flow of the processing will go on to a step S26 at which the ACK data is discarded. At the step S24, a mark is put on the frame having the updated transmission sequence number MN (S) of 4,094 corresponding to the delivery confirmation number MV (S) of 4,094 to indicate that ACK data representing delivery confirmation of the frame has already been received by the exchange 20 on the transmission side from the accounting transaction center 40 on the reception side. In the diagram of FIG. 9 for transmission side (6), the received-delivery-confirmation mark is represented by a black circle.

Case 7: With the expected delivery confirmation number MV (T) remaining at the value of 4,092, ACK data with a delivery confirmation number MV (S) of also 4,092 is received by the exchange 20 on the transmission side from the accounting transaction center 40 on the reception side as shown in the diagram of FIG. 9 for transmission side (7). Typically, the transmission sequence number MN (S) has a value of (MV (T)+MW)=(4,092+8)=4 where the value 4 is the modulo-4,096 number of (4,092+8). By carrying out the pieces of processing of the steps S2 to S6 in the flowchart shown in FIG. 8, the delivery confirmation number MV (S) of 4,092 is fetched from ACK data read out from the ACK-data buffer 50. At the step S8, the delivery confirmation number MV (S) of 4,092 is compared with the expected delivery confirmation number MV (T) of 4,092. Since the delivery confirmation number MV (S) is equal to the expected delivery confirmation number MV (T), the flow of the processing goes on from the step S8 to a step S10 at which the MV (T) updating unit 62 updates the expected delivery confirmation number MV (T) as a modulo-4,096 number. In this case, the expected delivery confirmation number MV (T) is incremented to 4,093. Then, at a step S12, the frame-data output unit 74 stores a frame with a transmission sequence number MN (S) of 4 into the transmission buffer 76. Subsequently, at the step S14, the MN (S) updating unit 78 increments the transmission sequence number MN (S) from 4 to 5. Then, at a step S16, the MV (T) updating unit 62 obtains frame data having a transmission sequence number MN (S) equal to the expected delivery confirmation number MV (T) of 4,093. Subsequently, at a step S18, the MV (T) updating unit 62 checks the frame data with a transmission sequence number MN (S) of 4,093 in order to form a judgment as to whether or not the frame data includes a mark indicating that the delivery confirmation of the frame has already been received by the exchange 20 on the transmission side from the accounting transaction center 40 on the reception side. If such a mark is included, the flow of the processing goes back to the step S10. If such a mark is not included, on the other hand, the processing is ended. In this case, since the frame data with the transmission sequence number MN (S) of 4,093 does not include a mark indicating that the delivery confirmation of the frame has already been received by the exchange 20 on the transmission side as shown in the diagram of FIG. 9 for transmission side (7), the processing is ended. As a result, the expected delivery confirmation number MV (T) is updated to 4,093 as shown in the diagram of FIG. 9 for transmission side (7).

Case 8: With the expected delivery confirmation number MV (T) updated to 4,093, ACK data with a delivery confirmation number MV (S) of 0 is received by the exchange 20 on the transmission side from the accounting transaction center 40 on the reception side as shown in the diagram of FIG. 9 for transmission side (8). By carrying out the pieces of processing of the steps S2 to S6 in the flowchart shown in FIG. 8, the delivery confirmation number MV (S) of 0 is fetched from ACK data read out from the ACK-data buffer 50. At the step S8, the delivery confirmation number MV (S) of 0 is compared with the expected delivery confirmation number MV (T) of 4,093. Since the delivery confirmation number MV (S) is not equal to the expected delivery confirmation number MV (T), the flow of the processing goes on from the step S8 to a step S20 at which the distance computation unit 66 computes a 32-bits signed distance {MV (S)–MV (T)} as a result of subtraction of the expected delivery confirmation number MV (T) from the delivery confirmation number MV (S). In this case, the distance {MV (S)–MV (T)} is found to be 0–4,093=4,093=H'FFFFF003' when expressed in the hexadecimal format. Then, at a step S22, the lowest-bit fetching unit 68 extracts 12lowest-order bits from the 32-bits signed distance {MV (S)–MV (T)} by storing the distance {MV (S)–MV (T)} into a 12-bits variable area x. In this case, the 12lowest-order bits have a value of H'003'. Subsequently, at a step S23, the distance judgment unit 72 reads out the window size MW (=8 in this example) from the window-size storage unit 70 and compares the window size MW of 8 with the value of 3 stored in the variable area x. Since the variable x (=3)<the window size (MW=8), the delivery confirmation number MV (S) is determined to be within the window. In this case, the flow of the processing goes on to a step S24. At the step S24, a mark is put on the frame having a transmission sequence number MN (S) of 0 corresponding to the delivery confirmation number MV (S) of 0 to indicate that ACK data representing delivery confirmation of the frame has already been received by the exchange 20 on the transmission side from the accounting transaction center 40 on the reception side. In the diagram of FIG. 9 for transmission side (8), the received-delivery-confirmation mark is represented by a black circle. As described above, it is possible to easily form a judgment as to whether or not the delivery confirmation number MV (S) is within the window set with the expected delivery confirmation number MV (T) used as a reference even if the window includes a value of 0. In this case, the expected delivery confirmation number MV (T) remains unchanged at the value of 4,093.

Case 9: With the expected delivery confirmation number MV (T) remaining at the value of 4,093, ACK data with a delivery confirmation number MV (S) of 4095 is received by the exchange 20 on the transmission side from the accounting center 40 on the reception side as shown in the diagram of FIG. 9 for transmission side (9). By carrying out the pieces of processing of the steps S2 to S6 in the flowchart shown in FIG. 8, the delivery confirmation number Mv (S) of 4,095 is fetched from ACK data read out from the ACK-data buffer 50. At the step S8, the delivery confirmation number MV (S) of 4,095 is compared with the expected delivery confirmation number MV (T) of 4,093. Since the delivery confirmation number MV (S) is not equal to the expected delivery confirmation number MV (T), the flow of the processing goes on from the step S8 to a step S20. The pieces of processing of the steps S20 to S24 are carried out in the same way as Cases 6 and 8 described above. At the step S24, a mark is put on the frame having the updated transmission sequence number MN (S) of 4,095 corresponding to the delivery confirmation number MV (S) of 4,095 to indicate that ACK data representing delivery confirmation of the frame has already been received by the exchange 20 on the transmission side from the accounting center 40 on the reception side. In the diagram of FIG. 9 for transmission side (9), the received-delivery-confirmation mark is represented by a black circle. In this case, the expected delivery confirmation number MV (T) remains unchanged at the value of 4,093.

Case 10: With the expected delivery confirmation number MV (T) remaining at the value of 4,093, ACK data with a delivery confirmation number MV (S) of also 4,093 is received by the exchange 20 on the transmission side from the accounting center 40 on the reception side as shown in the diagram of FIG. 9 for transmission side (10). As described in Case 7, the present value of the transmission sequence number MN (S) is 5, where the value of 5 is obtained as a result of updating the transmission sequence number MN (S) at the step S14 of Case 7. By carrying out the pieces of processing of the steps S2 to S6 in the flowchart shown in FIG. 8, the delivery confirmation number MV (S) of 4,093 is fetched from ACK data read out from the ACK-data buffer 50. At the step S8, the delivery confirmation number MV (S) of 4,093 is compared with the expected delivery confirmation number MV (T) of 4,093. Since the delivery confirmation number MV (S) is equal to the expected delivery confirmation number MV (T), the flow of the processing goes on from the step S8 to a step S10.

At the step S10, the MV (T) updating unit 62 updates the expected delivery confirmation number MV (T) as a modulo-4,096 number. In this case, the expected delivery confirmation number MV (T) of 4,093 is incremented to 4,094. Then, at a step S12, the frame-data output unit 74 stores a frame with a transmission sequence number MN (S) of 6, the modulo-4,096 number of (4,094+8) which is (MV (T)+MW), into the transmission buffer 76. Subsequently, at a step S14, the MN (S) updating unit 78 updates the transmission sequence number MN (S) as a modulo-4,096 number. In this case, the transmission sequence number MN (S) is incremented to 7. Then, at a step S16, the MV (T) updating unit 62 obtains a next frame having the transmission sequence number MN (S) equal to the updated expected delivery confirmation number MV (T) of 4,094. Subsequently, at a step S18, the MV (T) updating unit 62 checks the frame data with a transmission sequence number MN (S) of 4,094 in order to form a judgment as to whether or not the frame data includes a mark indicating that the delivery confirmation of the frame has already been received by the exchange 20 on the transmission side from the accounting center 40 on the reception side. In this case, since the frame data with the transmission sequence number MN (S) of 4,094 includes a mark indicating that the delivery confirmation of the frame has already been received by the exchange 20 on the transmission side as shown in the diagram of FIG. 9 for transmission side (7), the flow of the processing goes back to the step S10. At the step S10, the MV (T) updating unit 62 updates the expected delivery confirmation number MV (T) as a modulo-4,096 number. In this case, the expected delivery confirmation number MV (T) of 4,094 is incremented to 4,095. Then, at the step S12, the frame-data output unit 74 stores a frame with a transmission sequence number MN (S) of 6 into the transmission buffer 76. Subsequently, at. the step S14, the MN (S) updating unit 78 updates the transmission sequence number MN (S) as a modulo-4,096 number. In this case, the transmission sequence number MN (S) is incremented to 7. Subsequently, at a step S16, the MV (T) updating unit 62 obtains a next frame having the transmission sequence number MN (S) equal to the updated expected delivery confirmation number MV (T) of 4,095. Subsequently, at a step S18, the MV (T) updating unit 62 checks the frame data with a transmission sequence number MN (S) of 4,095 in order to form a judgment as to whether or not the frame data includes a mark indicating that the delivery confirmation of the frame has already been received by the exchange 20 on the transmission side from the accounting center 40 on the reception side. In this case, since the frame data with the transmission sequence number MN (S) of 4,095 includes a mark indicating that the delivery confirmation of the frame has already been received by the exchange 20 on the transmission side as shown in the diagram of FIG. 9 for transmission side (9), the flow of the processing again goes back to the step S10. The pieces of processing of the steps S10 to S18 are repeatedly carried out till the expected delivery confirmation number MV (T) is updated to 1 as shown in the diagram of FIG. 9 for transmission side (10) and a frame with a transmission sequence number MN (S) of 8 is put in the transmission buffer 76 for transmission to the accounting center 40.

(B) Operation of the Accounting Transaction Center 40

Figure 10:
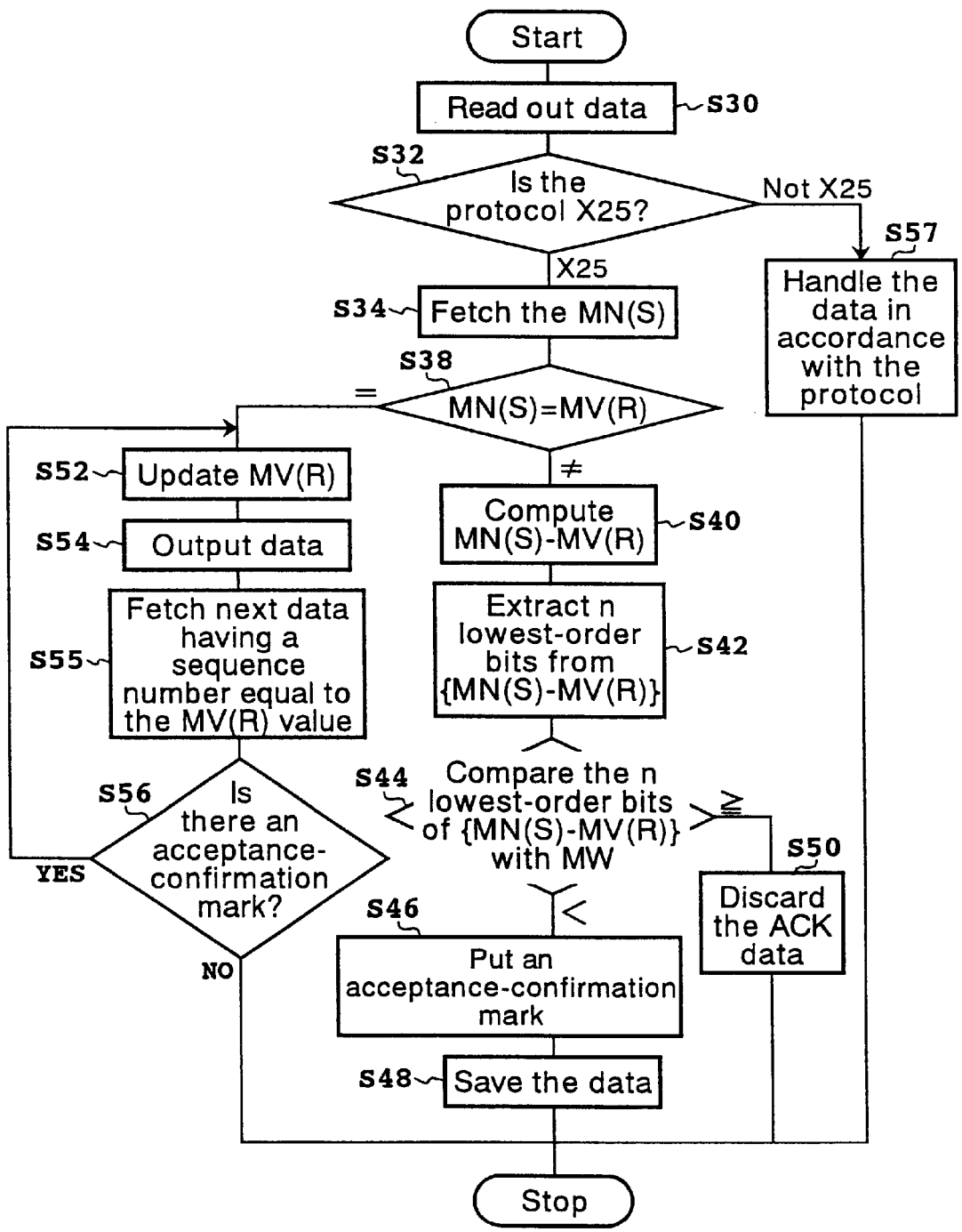
FIG. 10 is a flowchart representing the operation of the data link unit shown in FIG. 5.
Figure 11:
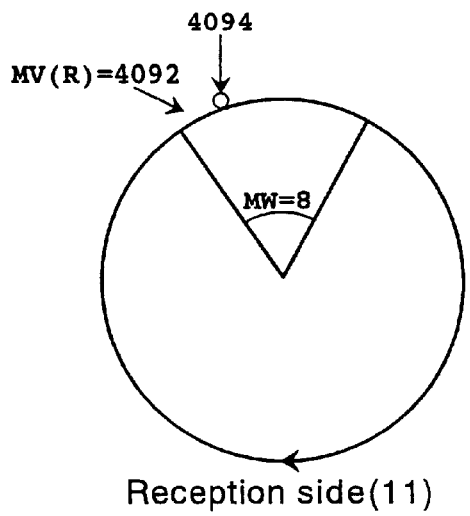
FIG. 11 is a diagram showing a shifting window on the reception side.
Figure 11:
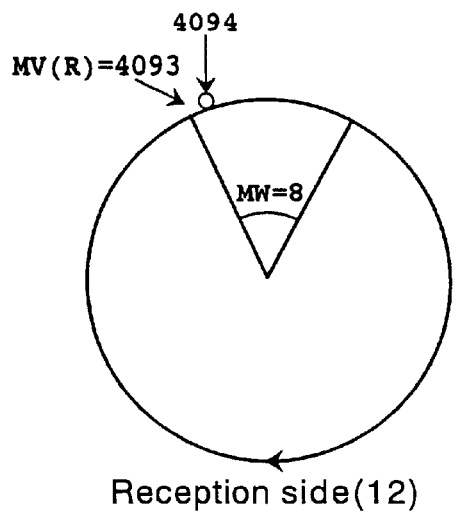
Figure 11:
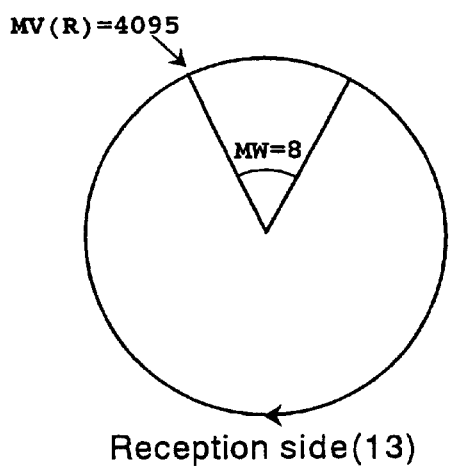
Figure 11:
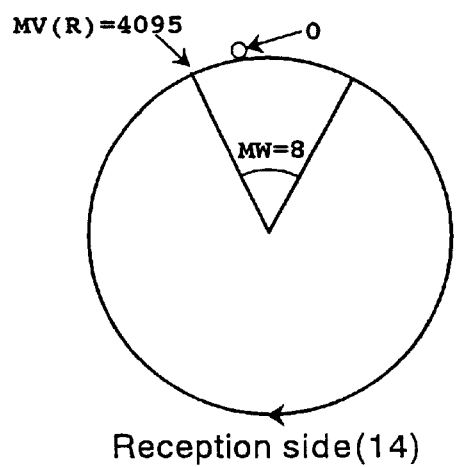
Figure 11:
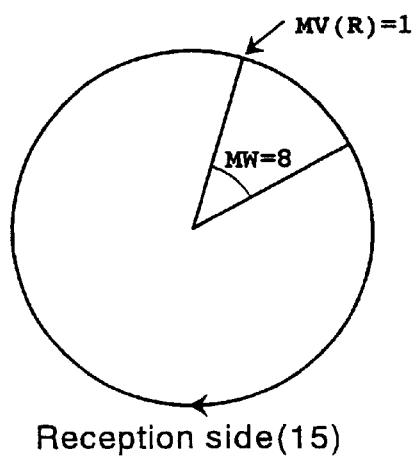

FIG. 10 is a flowchart representing the operation of the data link unit 42 shown in FIG. 5; and FIG. 11 is a diagram showing a shifting window in the accounting transaction center 40 on the reception side. Upon initialization, the accounting transaction center 40 sets the expected sequence number MV (R) stored in the MV (R) storage unit 92 at an initial value of 0 and clears the reception buffer 80 to 0. The line termination sub-units 41#i where i=1 to 3 store pieces of frame data received from the transmission lines 39#i where i=1 to 3 into the reception buffer 80. Each of the line termination sub-units 41#i also transfers a sequence number MN (S) included in a received piece of frame data to ACK data to be transmitted to the exchange 20 along with information indicating that the ACK data conforms to the X25 protocol.

The following cases 1 to 5 are explained by referring to diagrams for transmission sides (11) to (15) of FIG. 11 respectively in addition to the flowchart shown in FIG. 10.

Case 1: Assume that the accounting transaction center 40 has received pieces of frame data with sequence numbers up to 4,091. Thus, the expected sequence number MV (R), that is, supposed to be included in a frame to be received next, is 4,092. In this case, assume that a frame with a sequence number MN (S) of 4,094 is received. The frame with a sequence number MN (S) of 4,094 is stored by the line termination sub-unit 41#i into the reception buffer 80. As shown in FIG. 10, the flowchart begins with a step S30 at which the data reading unit 82 reads out the frame data from the reception buffer 80. Then, at a step S32, the protocol judgment unit 84 examines the frame data in order to form a judgment as to whether or not the type of the protocol is X25. If the type of the protocol is X25, the flow of the processing goes on to a step S34. If the type of the protocol is not X25, on the other hand, the flow of the processing goes on to a step S57. Since the type of the protocol is X25, the flow of the processing goes on to a step S34 at which the MN (S) fetching unit 86 fetches the sequence number MN (S) of 4,094 from the frame data.

Then, at a step S38, the MV (R) updating unit 90 reads out the expected sequence number MV (R) of 4,092 from the MV (R) storage unit 92 and compares the expected sequence number MV (R) with the sequence number MN (S) of 4,094. Since the expected sequence number MV (R) is not equal to the sequence number MN (S), the flow of the processing goes on to a step S40 at which the distance computation unit 94 computes a difference as a result of subtraction of the expected sequence number MV (R) from the sequence number MN (S), storing the signed difference in a 32-bits variable area. In this case, the distance {MN (S)–MV (R)} is found to be 4,094–4,092=2. Then, at a step S42, the lowest-bit fetching unit 98 extracts 12 lowest-order bits from the 32-bits signed distance {MN (S)–MV (R)}, by storing the distance {MN (S)–MV (R)} into a 12-bits variable area x. Subsequently, at a step S44, the distance judgment unit 102 reads out the window size MW (=8 in this example) from the window-size storage unit 100, comparing the window size MW with the value of 2 of the 12lowest-order bits of the 32-bits signed distance {MN (S)–MV (R)} stored in the variable area x. Since the variable x (=2)<the window size (MW=8), the sequence number MN (S) is determined to be within the window. In this case, the flow of the processing goes on to a step S46. If the value x representing the 12lowest-order bits from the 32-bits signed distance {MN (S)–Mv (R)} is found greater than the window size MW, on the other hand, the flow of the processing will go on to a step S50 at which the frame data is discarded. At the step S46, a mark is put, by the acceptance-confirmation marking unit 104, on the frame having the updated transmission sequence number MN (S) of 4,094 to indicate that frame data has already been accepted by the accounting transaction center 40 on the reception side.

In the diagram of FIG. 11 for reception side (11), the acceptance-confirmation mark is represented by a white circle. Then, at a step S48, the frame data with the sequence number of 4,094 is saved.

Case 2: The expected sequence number Mv (R) remains at 4,092, the same value as Case 1. Assume that a frame with a sequence number MN (S) of also 4,092 is received. In this case, at the step S38, since the expected sequence number MV (R) is found equal to the sequence number MN (S), the flow of the processing goes on to a step S52 at which the MV (R) updating unit 90 updates the expected transmission number MV (R) to 4,093 as shown in the diagram of FIG. 11 for reception side (12). Then, at a step S54, the data output unit 96 outputs frames with sequences numbers up to 4,092 to the user unit 46 by way of the network unit 44. Subsequently, at a step S55, a frame with a sequence number equal to the updated expected transmission number MV (R) of 4,093 is fetched. Then, at a step S56, the frame with a sequence number of 4,093 is examined in order to form a judgment as to whether or not the frame includes an acceptance-confirmation mark cited above. Since the frame with a sequence number of 4,093 does not include an acceptance-confirmation mark yet, the processing is ended. As shown in the diagram of FIG. 11 for reception side (12), the expected sequence number MV (R) was updated to 4,093.

Case 3: The expected sequence number MV (R) has been updated to 4,093 in Case 2. Assume that a frame with a sequence number MN (S) of also 4,093 is received. In this case, at the step S38, since the expected sequence number MV (R) is found equal to the sequence number MN (S), the flow of the processing goes on to a step S52 at which the MV (R) updating unit 90 updates the expected transmission number MV (R) to 4,094. Then, at a step S54, the data output unit 96 outputs the frame with a sequence number of 4,093 to the user unit 46 by way the network unit 44. Subsequently, at a step S55, a frame a sequence number equal to the updated expected transmission number MV (R) of 4,094 is fetched. Then, at a step S56, the frame with a sequence number of 4,094 is examined in order to form a judgment as to whether or not the frame includes an acceptance-confirmation mark cited above. Since the frame has an acceptance-confirmation mark, the flow of the processing again goes back to the step S52 to update the expected sequence number MV (R) to 4,095 as shown in the diagram of FIG. 11 for reception side (13), and to output this frame with a sequence number of 4,094 to the user unit 46 by way the network unit 44 at the step S54.

Case 4: The expected sequence number MV (R) has been updated to 4,095 in Case 3. In this case, assume that a frame with a sequence number MN (S) of 0 is received.

Then, at a step S38, the MV (R) updating unit 90 finds out that the expected sequence number MV (R) is not equal to the sequence number MN (S), the flow of the processing goes on to a step S40 at which the distance computation unit 94 computes a difference as a result of subtraction of the expected sequence number MV (R) from the sequence number MN (S), storing the signed difference in a 32-bits variable area. In this case, the distance {MN (S)–MV (R)} is found to be 0–4,095=H'FFFFF001'. Then, at a step S42, the lowest-bit fetchihg unit 98 extracts 12lowest-order bits from the 32-bits signed distance {MN (S)–MV (R)} by storing the distance {MN (S)–MV (R)} into a 12-bits variable area x. In this case, the 12lowest-order bits have a value of H'001'. Subsequently, at a step S44, the distance judgment unit 102 compares the window size MW (=8 in this example) with the value of 1 of the 12 lowest-order bits of the 32-bits signed distance {MN (S)–MV (R)} H'001' stored in the variable area x. Since the variable x (=1)<the window size (MW=8), the sequence number MN (S) is determined to be within the window. In this case, the flow of the processing goes on to a step S46. At the step S46, the acceptance-confirmation marking unit 104 puts a mark on the frame having the updated transmission sequence number MN (S) of 0 to indicate that frame data has already been accepted by the accounting transaction center 40 on the reception side. In the diagram of FIG. 11 for reception side (14), the acceptance-confirmation mark is represented by a white circle. Then, at a step S48, the frame data with the sequence number of 0 is saved. As described above, it is possible to easily form a judgment as to whether a sequence number. MN (S) is within a window set with the expected sequence number MV (R) used as a reference even if the sequence number MN (S) is smaller than the expected sequence number MV (R).

Case 5: The expected sequence number MV (R) remains at 4,095, the same value as Case 4. Assume that a frame with a sequence number MN (S) of also 4,095 is received. In this case, at the step S38, since the expected sequence number MV (R) is found equal to the sequence number MN (S), the flow of the processing goes on to a step S52 at which the MV (R) updating unit 90 updates the expected transmission number MV (R) to 0. The number 0 is the modulo-4,096 number of the number 4,096. Then, at a step S54, the data output unit 96 outputs the frame with a sequence number of 4,095 to the user unit 46 by way the network unit 44. Subsequently, at a step S55, a frame a sequence number equal to the updated expected transmission number MV (R) of 0 is fetched. Then, at a step S56, the frame with a sequence number of 0 is examined in order to form a judgment as to whether or not the frame includes an acceptance-confirmation mark cited above. Since the frame has an acceptance-confirmation mark, the flow of the processing goes back to the step S52 to update the expected sequence number MV (R) to 1 as shown in the diagram of FIG. 11 for reception side (15), and to output this frame with a sequence number of 0 to the user unit 46 by way the network unit 44 at the step S54. After completing the step S56, the processing is ended.

As described above, the present invention allows complicated judgment processing to be carried out with ease, hence, eliminating design errors. In addition, the number of items to be tested during verification of a software design can be reduced and the processing time of the real operation can be shortened.

The present invention is not limited to details of the embodiment described above. Instead, the scope of the present invention is defined by appended claims, and all changes as well as modifications falling within the equivalence of the scope of the claims are therefore embraced by the invention.

What is claimed is:

1. A control apparatus with a window control function, said apparatus comprising:

distance computation means for computing a signed n-bit distance as a result of subtraction of a second sequence number cyclically updated to vary like a modulo-N number from a first sequence number cyclically updated to vary like a modulo-N number where N is a positive integer greater than 1 and the nth power of 2 is greater than N($2^n$>N);

lowest-order-bit extraction means for extracting m lowest-order bits of said distance where the mth power of 2 is equal to N($2^m$=N); and distance judgment means for forming a judgment as to whether or not said first sequence number is within a window set with said second sequence number used as a reference by comparison of said m lowest-order bits of said distance extracted by said lowest-order-bit extraction means with a size of said window.

2. A control apparatus with a window control function according to claim 1, wherein all negative values of said n-bit distance are expressed in a 2's complement format.

3. A control apparatus with a window control function according to claim 2, wherein the N is equal to the kth power of 2 where k is a positive integer of at least 1 ($=2^k$ and m is equal to k(m=k).

4. A control apparatus with a window control function according to claim 3, wherein said first sequence number is determined to be within said window if the value of said m lowest-order bits of said distance is smaller than said size of said window.

5. A storage medium for storing programs, said medium comprising:
   a first area for storing a first sequence number cyclically updated to vary like a modulo-N number where N is a positive integer greater than 1;
   a second area for storing a second sequence number cyclically updated to vary like a modulo-N number; and
   a third area for storing a signed n-bit distance where the nth power of 2 is greater than N($2^n$>N); and
   said programs include:
      a distance computation program for computing said signed n-bit distance as a result of subtraction of said second sequence number from said first sequence number and storing said result in said third area;
      a lowest-order-bit extraction program for extracting m lowest-order bits of said distance where the mth power of 2 is equal to N($2^m$=N); and
      a distance judgment program for forming a judgment as to whether or not said first sequence number is within a window set with said second sequence number used as a reference by comparison of said m lowest-order bits of said distance extracted by said lowest-order-bit extraction means with a size of said window.

6. A communication control apparatus having a window control function, said apparatus comprising:
   data reception means for receiving data including a first sequence number MN(S) cyclically updated to vary like a modulo-N number where N is a positive integer greater than 1;
   distance computation means for computing a signed n-bit distance as a result of subtraction of a second sequence number MV(R) cyclically updated to vary like a modulo-N number from said first sequence number MN(S) received by said data reception means where the nth power of 2 is greater than N ($2^n$>N);
   lowest-order-bit extraction means for extracting m lowest-order bits of said distance where the mth power of 2 is equal to N($2^m$=N);
   distance judgment means for forming a judgment as to whether or not said first sequence number MN(S) is within a window set with said second sequence number MV(R) used as a reference by comparison of said m lowest-order bits of said distance extracted by said lowest-order-bit extraction means with a size of said window;
   mark appending means for appending an acceptance-confirmation mark to said data including said first sequence number MN(S) if said first sequence number MN(S) is within said window;
   data control means for discarding said data including said first sequence number MN(S) if said first sequence number MN(S) is not within a window, and number updating means for updating said second sequence number MV(R) as a modulo-N number on the basis of said acceptance-confirmation mark if said second sequence number MV(R) expected to be received next is equal to said first sequence number MN(S) included in said data received by said data reception means.

7. A communication control apparatus having a window control function, said apparatus comprising:
   data reception means for receiving delivery confirmation data including a first sequence number MN(S) and used for showing delivery confirmation from a reception side;
   distance computation means for computing a signed n-bit distance as a result of subtraction of a second sequence number MV(T) from said first sequence number MN(S) where the nth power of 2 is greater than N ($2^n$>N) if said first sequence number MN(S) received by said data reception means is not equal to said second sequence number MV(T) wherein said second sequence number MV(T) is a number expected to be included in delivery confirmation data to be received next from said reception side to indicate delivery confirmation;
   lowest-order-bit extraction means for extracting m lowest-order bits of said distance where the mth power of 2 is equal to N ($2^m$=N);
   distance judgment means for forming a judgment as to whether or not said first sequence number MN(S) is within a window set with said second sequence number MV(T) used as a reference by comparison of said m lowest-order bits of said distance extracted by said lowest-order-bit extraction means with a size of said window;
   mark appending means for appending a received-delivery-confirmation mark to said delivery confirmation data including said first sequence number MN(S) if said first sequence number MN(S) is within said window; and
   number updating means for updating said second sequence number MV(T) as a modulo-N number on said basis of said received-delivery-confirmation mark if said first sequence number MN(S) received by said data reception means is equal to said second sequence number MV(T) wherein said second sequence number MV(T) is a number expected to be included in delivery confirmation data to be received next from said reception side to indicate delivery confirmation.

\* \* \* \* \*